(12) United States Patent
Sakai

(10) Patent No.: US 10,642,129 B2
(45) Date of Patent: May 5, 2020

(54) DIGITAL CAMERA INCLUDING PRINTER

(71) Applicant: FUJIFILM Corporation, Tokyo (JP)

(72) Inventor: Masayuki Sakai, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/354,531

(22) Filed: Mar. 15, 2019

(65) Prior Publication Data

US 2019/0212635 A1 Jul. 11, 2019

Related U.S. Application Data

(63) Continuation of application No. PCT/JP2017/033125, filed on Sep. 13, 2017.

(30) Foreign Application Priority Data

Sep. 16, 2016 (JP) ................................. 2016-181503

(51) Int. Cl.
*G03B 17/52* (2006.01)
*G03B 15/05* (2006.01)
(Continued)

(52) U.S. Cl.
CPC ............ *G03B 17/52* (2013.01); *G03B 15/05* (2013.01); *G03B 17/02* (2013.01); *G03B 17/50* (2013.01);
(Continued)

(58) Field of Classification Search
None
See application file for complete search history.

(56) References Cited

U.S. PATENT DOCUMENTS 3,530,778 A * 9/1970 Finelli .................... G03B 17/02
396/32
4,181,414 A * 1/1980 Ito .......................... G03B 17/52
396/30
(Continued)

FOREIGN PATENT DOCUMENTS

JP H10-10626 A 1/1998
JP H11-4372 A 1/1999
(Continued)

OTHER PUBLICATIONS

The extended European search report issued by the European Patent Office dated Jun. 17, 2019, which corresponds to European Patent Application No. 17850941.0-1022 and is related to U.S. Appl. No. 16/354,531.

*Primary Examiner* — William B Perkey
(74) *Attorney, Agent, or Firm* — Studebaker & Brackett PC

(57) ABSTRACT

The shape of a camera body of a digital camera including a printer viewed from the front surface is a square shape, and an imaging optical system is positioned at the center of a camera body. An axis crossing an optical axis of the imaging optical system in a vertical direction is referred to as a vertical axis, and an axis crossing the optical axis in a horizontal direction is referred to as a horizontal axis. A grip portion is formed on the camera body at positions that are symmetric with respect to the vertical axis and symmetric with respect to the horizontal axis. The grip portion has an annular shape and a concave shape that is concave from the surface around the grip portion. The imaging optical system is positioned at the center of the annular grip portion in a case where the digital camera including a printer is viewed from the front surface of the camera body.

15 Claims, 11 Drawing Sheets

(51) Int. Cl.
*G03B 17/02* (2006.01)
*G03C 3/00* (2006.01)
*G03B 17/50* (2006.01)
*H04N 5/225* (2006.01)
*G03B 19/02* (2006.01)

(52) U.S. Cl.
CPC ............ *G03B 19/02* (2013.01); *G03C 3/00* (2013.01); *H04N 5/225* (2013.01); *H04N 5/2252* (2013.01); *H04N 5/22525* (2018.08)

(56) References Cited

U.S. PATENT DOCUMENTS

| | | | | |
|---|---|---|---|---|
| 4,823,155 | A * | 4/1989 | Kataoka | G03B 17/52 396/30 |
| 5,218,390 | A * | 6/1993 | Swayze | G03B 15/05 396/423 |
| 6,301,438 | B1 * | 10/2001 | Burdenko | G03B 17/52 396/30 |
| 2002/0015593 | A1 | 2/2002 | Kai et al. | |
| 2002/0039488 | A1 | 4/2002 | Sasaki et al. | |
| 2002/0054759 | A1 * | 5/2002 | Sasaki | G03B 17/50 396/30 |
| 2004/0136703 | A1 * | 7/2004 | Sasaki | G03B 17/52 396/30 |
| 2006/0067659 | A1 * | 3/2006 | Takeshita | B41J 3/36 396/36 |
| 2008/0248833 | A1 * | 10/2008 | Silverbrook | B41J 2/01 455/556.1 |
| 2014/0184903 | A1 | 7/2014 | Takahashi et al. | |
| 2015/0049202 | A1 | 2/2015 | Okabe et al. | |
| 2015/0334275 | A1 * | 11/2015 | Ishikawa | H04N 5/23245 348/376 |
| 2017/0139226 | A1 * | 5/2017 | Adervall | G02B 7/04 |
| 2019/0361336 | A1 * | 11/2019 | Nakai | G03C 8/42 |

FOREIGN PATENT DOCUMENTS

| | | |
|---|---|---|
| JP | H11249233 A | 9/1999 |
| JP | H11-317897 A | 11/1999 |
| JP | 2002-040534 A | 2/2000 |
| JP | 2002-296659 A | 10/2002 |
| JP | 2003-134372 A | 5/2003 |
| JP | 2003-330084 A | 11/2003 |
| JP | 2004-340991 A | 12/2004 |
| JP | 2007-329657 A | 12/2007 |
| JP | 2014-126848 A | 7/2014 |
| JP | 2015-84075 A | 4/2015 |

* cited by examiner

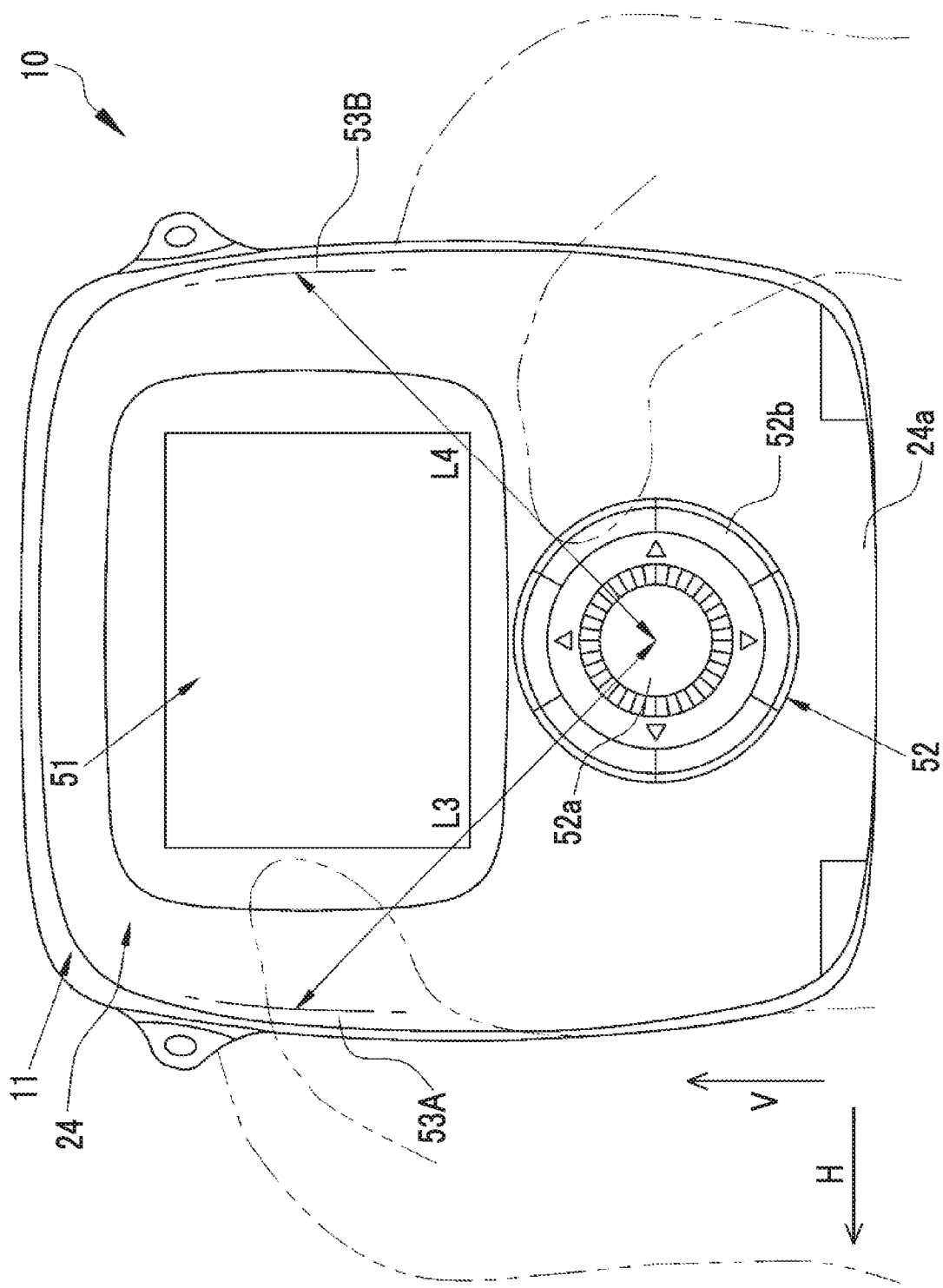

DIGITAL CAMERA INCLUDING PRINTER

CROSS-REFERENCE TO RELATED APPLICATIONS

This application is a Continuation of PCT International Application No. PCT/JP2017/033125 filed on 13 Sep. 2017, which claims priority under 35 U.S.C § 119(a) to Japanese Patent Application No. 2016-181503 filed on 16 Sep. 2016. The above application is hereby expressly incorporated by reference, in its entirety, into the present application.

BACKGROUND OF THE INVENTION

1. Field of the Invention

The present invention relates to a digital camera including a printer.

2. Description of the Related Art

A digital camera including a printer, which records an image on a sheet-like recording medium, for example, a mono-sheet instant film, is known. An imaging unit that includes an imaging optical system, a solid-state imaging element, and the like and a printer unit that includes an exposure head, spreading rollers, and the like are built in a digital camera including a printer disclosed in JP2002-296659A (corresponding to US2002/0039488A1). In a case where an imaging operation is performed, a subject image formed on the solid-state imaging element is photoelectrically converted and digital image data obtained through digital conversion is written in a memory. Then, the exposure head and the spreading rollers are driven on the basis of image data read from the memory, and exposure is performed while the instant film is discharged. Accordingly, an image is recorded. After the instant film is discharged from a film discharge port and predetermined time has passed, the image appears on one surface of the instant film.

Further, the digital camera including a printer disclosed in JP2002-296659A includes a horizontally long rectangular camera body, and a grip portion is provided on the left side surface of the camera body. Furthermore, as an electronic camera not having a printer function, there is an electronic camera where grip portions are provided on both sides of a camera body, for example, as in an electronic camera disclosed in JP2002-040534A (corresponding to US2002/0015593A1).

SUMMARY OF THE INVENTION

Since the grip portion is provided on only the left side surface of the camera body in the digital camera including a printer disclosed in JP2002-296659A, there is a case where it is difficult to hold the camera body and a holding feeling is bad in the case of a certain orientation of the camera body during imaging. Particularly, in a case where imaging is to be performed in a state where the orientation of the camera body is changed by an angle of 90°, the grip portion is positioned on the upper side or the lower side of the camera body. For this reason, it is very difficult to hold the camera body and the holding of the camera body is unstable. Further, even in a case where imaging is to be performed in a state where the orientation of the camera body, which includes the grip portions on both sides as in the electronic camera disclosed in JP2002-040534A, is changed by an angle of 90°, the grip portions are positioned on the upper side or the lower side of the camera body. For this reason, it is difficult to hold the camera body.

Accordingly, the applicant has considered making a digital camera including a printer of which a camera body is easily held and a holding feeling is improved even in any case of vertical imaging that is performed in a state where the camera body is oriented vertically or horizontal imaging that is performed in a state where the camera body is oriented horizontally.

An object of the invention is to provide a digital camera including a printer that is easily held and a holding feeling is improved in any case of vertical imaging and horizontal imaging.

A digital camera including a printer of the invention comprises an imaging unit, a printer unit, and a camera body. The imaging unit includes an imaging optical system and takes a subject image to output image data. The printer unit records an image on a recording medium on the basis of the image data output from the imaging unit. The imaging optical system is disposed at a center of a front surface of the camera body, and a grip portion is formed on the camera body at positions symmetric with respect to a first axis crossing an optical axis of the imaging optical system in a first direction and symmetric with respect to a second axis crossing the optical axis in a second direction orthogonal to the first direction.

It is preferable that a shape of the camera body viewed from the front surface is a square shape where a vertical length in the first direction and a horizontal length in the second direction are equal to each other.

It is preferable that the grip portion has a concave or convex ring shape and the imaging optical system is positioned at a center of the ring shape.

It is preferable that the grip portion has a plurality of concave areas or convex areas formed around the imaging optical system.

It is preferable that the camera body includes a release switch used to take a subject image by the imaging unit and at least a part of the release switch is positioned within the concave area or the convex area.

It is preferable that the camera body includes a release switch used to take a subject image by the imaging unit and the entire release switch is positioned within the concave area or the convex area.

It is preferable that the camera body is provided with two release switches and the two release switches are disposed at positions symmetric with respect to the first axis.

It is preferable that the camera body is provided with two release switches and the two release switches are disposed at positions rotationally symmetric with respect to the imaging optical system as a center by an angle of 180°.

It is preferable that the digital camera including a printer further comprises a flash irradiating a subject with illumination light and the flash is disposed at a position corresponding to the imaging optical system in the first direction or the second direction.

It is preferable that the recording medium is a mono-sheet instant film, the printer unit includes an exposure head exposing the instant film on the basis of the image data to record an image, and the exposure head is positioned between the flash and the imaging unit. Further, it is preferable that the instant film is loaded in the camera body in a state where the instant film is stored in a film pack, and the camera body includes a loading lid that is provided on a back side thereof and loads the film pack. Furthermore, it is preferable that the digital camera including a printer further comprises a transport roller transporting the instant film and an exposure position where the exposure head exposes the film is positioned between the film pack and the transport roller.

It is preferable that the camera body includes a discharge port for the film at one end of the camera body in the first direction or the second direction. It is preferable that the camera body includes a display unit provided on a back thereof and displaying an image and a transport path along which the film is discharged from the discharge port is positioned between the imaging unit and the display unit.

It is preferable that the digital camera including a printer further comprises an operation unit positioned between the grip portion and the imaging optical system. Further, it is preferable that a finger rest portion protruding from the back and having a convex shape is formed on the camera body.

According to the invention, a digital camera including a printer is easily held even in any case of vertical imaging and horizontal imaging and a holding feeling can be improved.

BRIEF DESCRIPTION OF THE DRAWINGS

FIG. 6 is a back view of the digital camera including a printer.

DESCRIPTION OF THE PREFERRED EMBODIMENTS

First Embodiment

Figure 1:
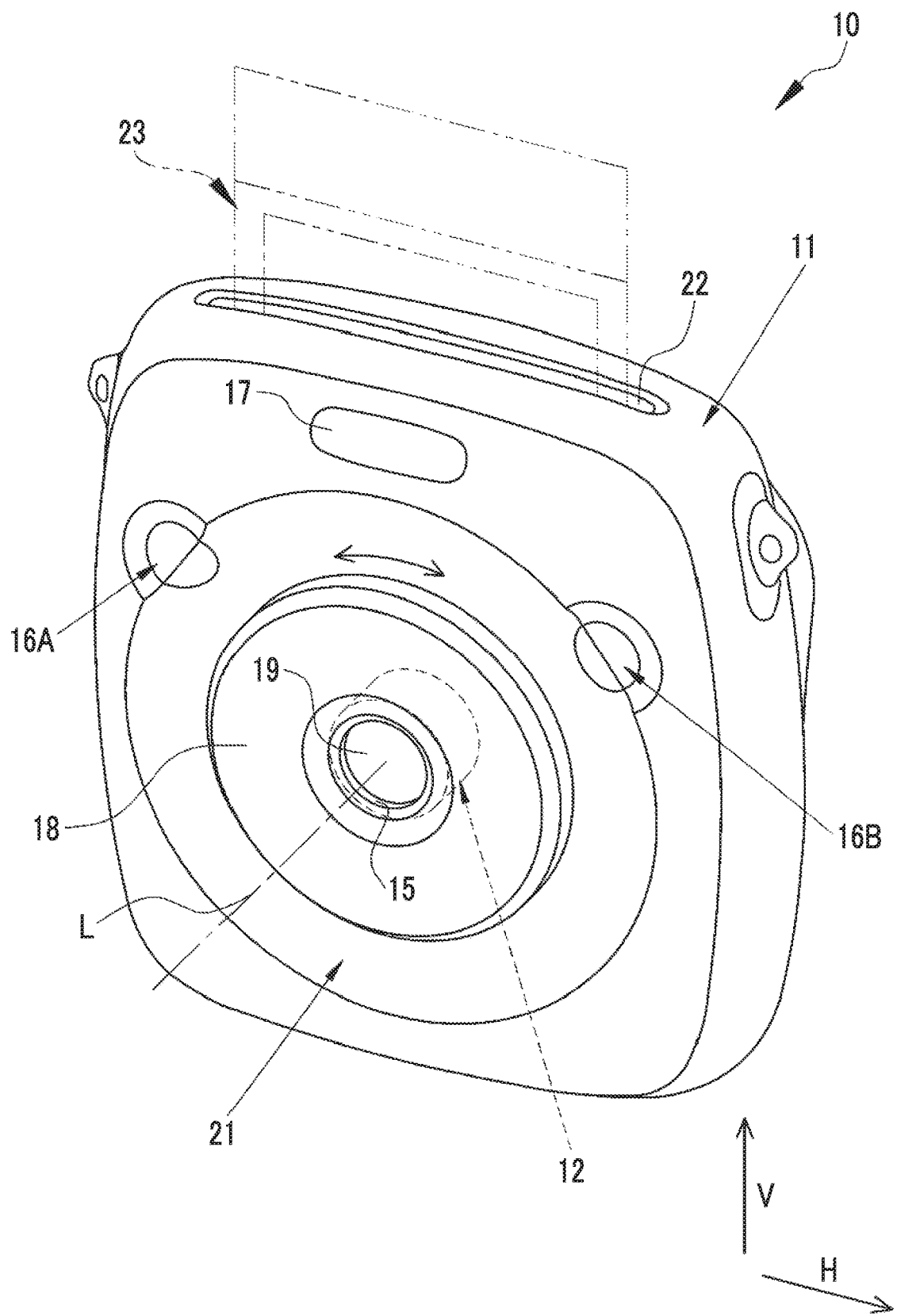
FIG. 1 is a perspective view showing the front of a digital camera including a printer.
Figure 3:
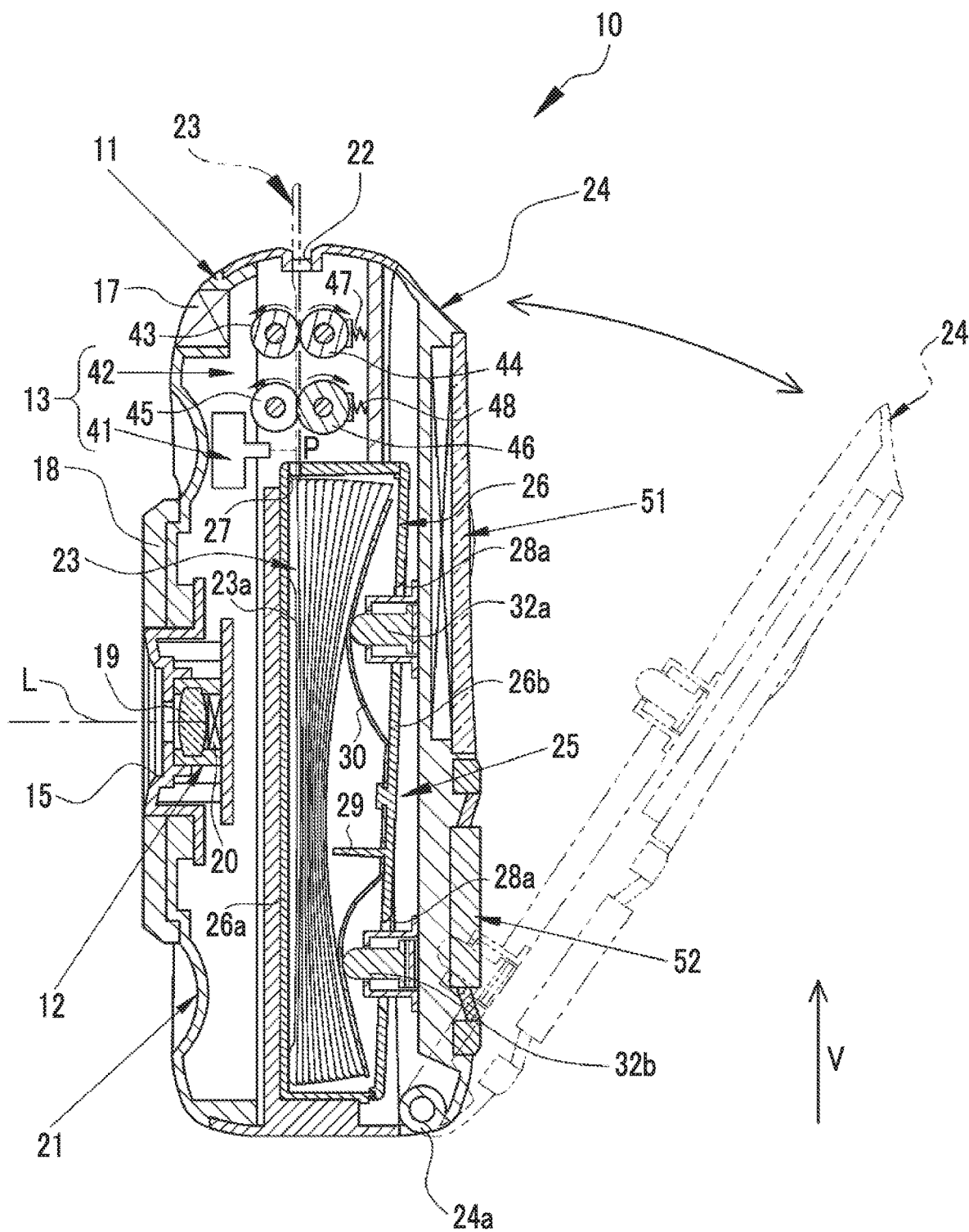
FIG. 3 is a longitudinal sectional view taken along line III-III of FIG. 2.

In FIG. 1, a digital camera 10 including a printer comprises a camera body 11, an imaging unit 12, and a printer unit 13 (see FIG. 3). An imaging window 15, two release switches 16A and 16B, a flash 17, and an operation ring 18 are provided on the front surface of the camera body 11.

Figure 2:
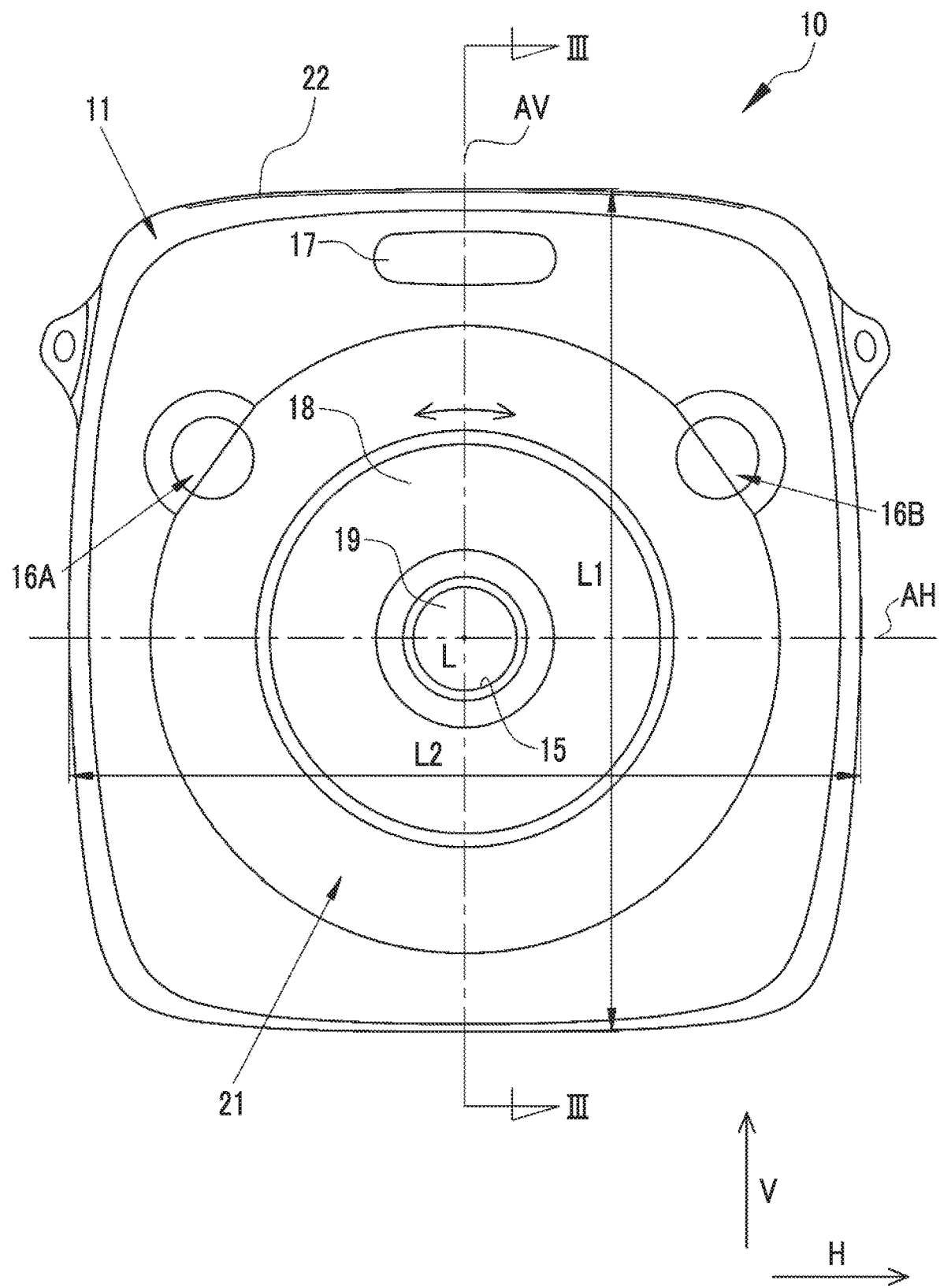
FIG. 2 is a front view of the digital camera including a printer.

As shown in FIG. 2, the shape of the camera body 11 viewed from the front surface is a square shape. Specifically, the camera body 11 has a square shape where a vertical length L1 of the camera body 11 in a vertical direction V (first direction) and a horizontal length L2 of the camera body 11 in a horizontal direction (second direction) orthogonal to the vertical direction V are equal to each other, and the square shape also includes a case where the vertical length L1 and the horizontal length L2 are substantially equal to each other. A film unit 23 as a recording medium, which is used for the digital camera 10 including a printer, also has a substantially square shape.

The imaging window 15 is disposed at the center of the front surface of the camera body 11. The imaging window 15 allows an imaging optical system 19 (see FIG. 3) of the imaging unit 12 to be exposed to the outside. An optical axis L of the imaging optical system 19 is orthogonal to the vertical direction V and the horizontal direction H. The imaging optical system 19 is positioned at the center of the camera body 11 in the vertical direction V and the horizontal direction H.

The imaging unit 12 includes the imaging optical system 19 and a solid-state imaging element 20 (see FIG. 3). The solid-state imaging element 20 is, for example, a complementary metal oxide semiconductor (CMOS) image sensor, and includes a light-receiving surface that is formed of a plurality of pixel (not shown) arranged in the form of a two-dimensional matrix. Each of the pixels includes a photoelectric conversion element, and photoelectrically converts a subject image, which is formed on the light-receiving surface by the imaging optical system 19, to generate an imaging signal.

Further, the solid-state imaging element 20 comprises signal processing circuits, such as a noise removal circuit, an automatic gain controller, and an A/D conversion circuit, (all of them are not shown). The noise removal circuit performs noise removal processing on an imaging signal. The automatic gain controller amplifies the level of an imaging signal to an optimum value. The A/D conversion circuit converts an imaging signal into a digital signal and outputs the digital signal to an internal memory (not shown) from the solid-state imaging element 20. An output signal of the solid-state imaging element 20 is image data (so-called RAW data) that has one color signal for each pixel.

An axis crossing the optical axis L in the vertical direction V is referred to as a vertical axis AV (first axis), and an axis crossing the optical axis L in the horizontal direction H is referred to as a horizontal axis AH (second axis). A grip portion 21 is formed on the camera body 11 at positions that are symmetric with respect to the vertical axis AV and are symmetric with respect to the horizontal axis AH. Specifically, the grip portion 21 has an annular shape (the shape of a ring) and a concave shape that is concave from the surface around the grip portion 21. The imaging optical system 19 is positioned at the center of the annular grip portion 21 in a case where the digital camera 10 including a printer is viewed from the front surface of the camera body 11. Further, the grip portion 21 is formed so that the shape of the cross section of the grip portion 21 taken along the optical axis L has the shape of an arc (see FIG. 3). The positions, which are symmetric with respect to the axis, include positions that are substantially symmetric with respect to the axis.

The release switches 16A and 16B are disposed at positions that are symmetric with respect to the vertical axis AV. Specifically, the release switches 16A and 16B are disposed at positions that are equidistant from the vertical axis AV. In a case where at least one of the release switch 16A or 16B is operated to be pressed, the solid-state imaging element 20 to be described later is driven and a subject image is taken.

A part of the release switches 16A and 16B are disposed in the grip portion 21. Portions of the release switches 16A and 16B, which are disposed in the grip portion 21, are formed in the shape of a curved surface that is concave along the concave shape.

The flash 17 is disposed at a position that corresponds to the imaging optical system 19 in the horizontal direction H, that is, on the vertical axis AV. Corresponding, which is mentioned here, includes a case where the flash 17 is disposed at a position substantially corresponding to the imaging optical system. For example, in a case where an exposure value is equal to or smaller than a predetermined value when the imaging unit 12 images a subject, the flash 17 automatically irradiates the subject with illumination light.

The operation ring 18 is a ring-shaped operation member that is positioned between the grip portion 21 and the imaging optical system 19, and is mounted so as to be movable rotationally about the optical axis L. The operation ring 18 is an operation member that is operated to turn on or off the power supply of the digital camera 10 including a printer.

A film discharge port 22 is provided on one end of the camera body 11 in the vertical direction V, that is, the upper surface of the camera body 11. Although described in detail, a film unit 23 on which an image has been printed is discharged from the film discharge port 22.

As shown in FIG. 3, a loading lid 24 is provided on the back side of the camera body 11. The loading lid 24 is mounted through a hinge portion 24a that is provided at the lower end of the camera body 11. The loading lid 24 is supported so as to be movable rotationally between an open position (a position shown by a two-dot chain line) where a film pack loading chamber 25 provided in the camera body 11 is opened and a closed position (a position shown by a solid line) where the film pack loading chamber 25 is covered. A film pack 26 is loaded in the film pack loading chamber 25.

The film pack 26 includes a box-shaped case 26a and a lid 26b that covers the opening of the case 26a. A plurality of film units 23 are superimposed and stored in the case 26a so that exposure surfaces 23a of the plurality of film units 23 face the left side in FIG. 3. Further, a film sending port 27, through which the lowermost film unit 23 is sent to the outside from the film pack 26, is formed on the end face of the case 26a facing the film discharge port 22. The film sending port 27 is closed from the outside by a light-shielding seal (not shown) having flexibility.

A pair of openings 28a and 28b is formed in the lid 26b with a predetermined interval therebetween. Further, a support piece 29, film unit-pressing plates 30, and the like are provided on the inner surface of the lid 26b. The openings 28a and 28b are inlets where pressing members 32a and 32b provided on the inner surface of the loading lid 24 enter in a case where the loading lid 24 is closed. The support piece 29 supports the middle portion of the film unit 23 from behind.

In a case where the loading lid 24 is closed, the film unit-pressing plates 30 are pressed by the pressing members 32a and 32b and are bent to be convex toward the bottom of the case 26a. Accordingly, the lowermost film unit 23 is pushed against the bottom of the case 26a.

Figure 4:
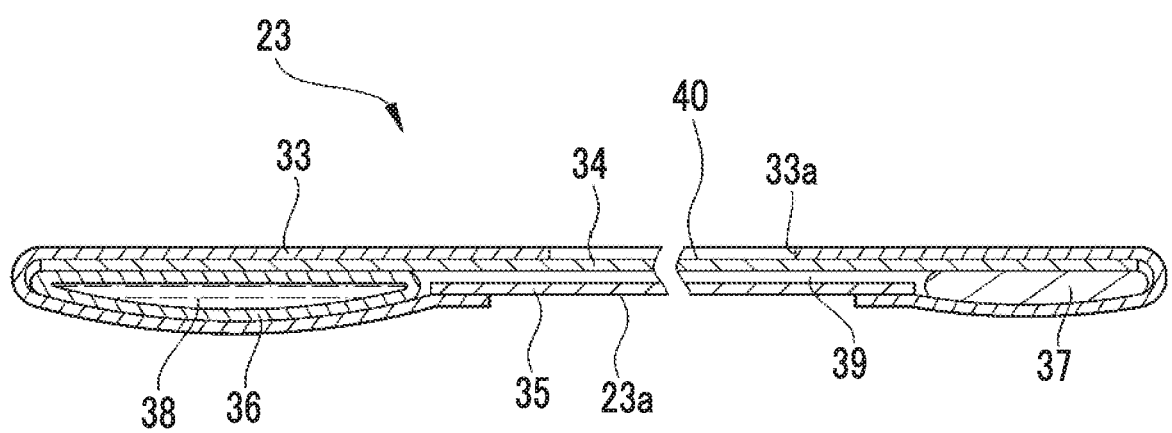
FIG. 4 is a cross-sectional view of a film unit.

The film unit 23 as a recording medium is a so-called mono-sheet film. As shown in FIG. 4, the film unit 23 includes a mask sheet 33, a photosensitive sheet 34, a cover sheet 35, a developer pod 36, and a trap portion 37. The mask sheet 33 is formed of plastic in the shape of a thin sheet, and comprises a screen opening 33a. The photosensitive sheet 34 is provided with a photosensitive layer, a diffusive-reflective layer, an image-receiving layer, and the like. The cover sheet 35 includes an exposure surface 23a that faces an exposure head 41 to be described later.

The developer pod 36 is formed substantially in the shape of a bag, and is filled with a developer 38. The developer pod 36 is bonded to an end portion of the photosensitive sheet 34 facing the film sending port 27, and is wrapped with an end portion of the mask sheet 33. The trap portion 37 is bonded to an end portion of the photosensitive sheet 34 opposite to the film sending port 27, and is wrapped with an end portion of the mask sheet 33 likewise.

Although described in detail later, the photosensitive layer of the film unit 23 is irradiated with printing light and is exposed during printing. Then, the developer pod 36 is torn and opened at the time of development, and the developer 38 flows into a gap 39 between the photosensitive sheet 34 and the cover sheet 35 and is spread. Accordingly, a latent image is photochemically formed on the photosensitive layer, is reversed by the diffusive-reflective layer, and is transferred to the image-receiving layer. In this way, a positive image appears on a positive image observation surface 40 of the photosensitive sheet 34 that is exposed through the screen opening 33a.

In a case where printing processing is started, the lowermost film unit 23 is sent to the outside of the film pack 26 through the film sending port 27 by a claw (not shown) that is inserted into a claw opening (not shown) of the bottom of the case 26a. The film unit 23, which is sent to the outside of the film pack 26, (a position shown by a two-dot chain line) is subjected to exposure processing and development processing by the printer unit 13 that is provided between the film sending port 27 and the film discharge port 22.

The printer unit 13 includes an exposure head 41 and a developer spreading unit 42 that are arranged in this order toward the film discharge port 22 from the film sending port 27. For example, the exposure head 41 includes a light source, a liquid crystal shutter, a lens, and the like, and is disposed at a position facing a film unit-transport path. Specifically, the exposure head 41 is positioned between the flash 17 and the imaging unit 12 in the vertical direction V. Accordingly, the camera body 11 can be reduced in thickness. Further, the film unit-transport path along which the film unit 23 is transported by the developer spreading unit 42 is positioned between the imaging unit 12 and a back display unit 51 to be described later. Accordingly, the camera body 11 can be reduced in size.

The exposure head 41 irradiates the exposure surface 23a of the film unit 23 with linear printing light that is parallel to a main scanning direction (a width direction of the film unit). Accordingly, a line image, which has a gradation according to image data, is exposed to the photosensitive layer of the film unit 23.

As shown in FIG. 3, the developer spreading unit 42 comprises transport rollers 43 and 44 and spreading rollers 45 and 46. The transport rollers 43 and 44 and the spreading rollers 45 and 46 are rotationally driven by a motor (not shown). The transport roller 44 is pressed toward the transport roller 43 by a spring 47 as a pressing mechanism, and the spreading roller 46 is pressed toward the spreading roller 45 by a spring 48 as a pressing mechanism.

The transport rollers 43 and 44 pinch both side portions of the film unit 23, which is sent from the film pack 26, and transport the film unit 23 toward the spreading rollers 45 and 46. An exposure position P where the exposure head 41 exposes the film unit 23 to printing light is positioned between the film sending port 27 of the film pack 26 and the transport rollers 43 and 44. Accordingly, the camera body 11 can be reduced in thickness.

The spreading rollers 45 and 46 pinch the film unit 23, which is delivered from the transport rollers 43 and 44, over the entire width of the film unit 23 and allow the developer pod 36 to be torn and opened and allow the developer 38 to be spread into the gap 39 while transporting the film unit 23 toward the film discharge port 22. The film unit 23, which has been subjected to development processing by the spreading rollers 45 and 46, is transported to the film discharge port 22 and is discharged to the outside of the camera body 11.

Figure 5:
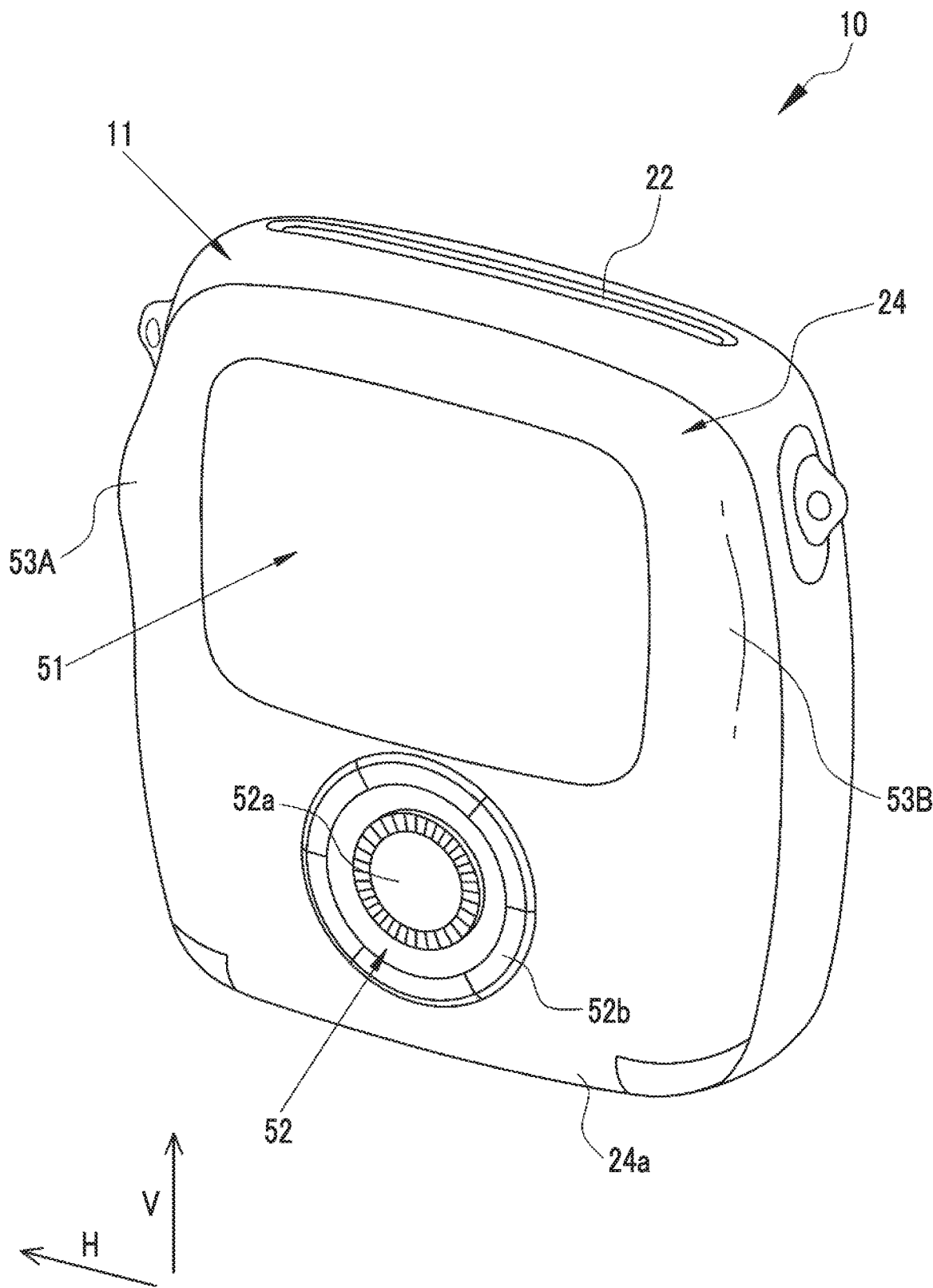
FIG. 5 is a perspective view showing the back of the digital camera including a printer.

As shown in FIG. 5, a back display unit 51 and an operation unit 52 are provided on the outer surface of the loading lid 24, that is, the back of the camera body 11. The back display unit 51 is formed of, for example, a liquid crystal display (LCD) panel. Image data corresponding to one frame, which is output from the solid-state imaging element 20, is sequentially input to the back display unit 51, and is displayed on the back display unit 51 as a live view image.

In a case where at least one of the release switch 16A or 16B is operated to be pressed by a user, image data output from the solid-state imaging element 20 is subjected to compression processing after being subjected to publicly known image processing, such as matrix calculation, demosaicing processing, γ correction, brightness conversion, color difference conversion, and resizing, by an image processing unit (not shown). Then, the image data, which has been subjected to the image processing and compression, is recorded in the internal memory (not shown), such as a flash memory, provided in the camera body 11.

In a case where a menu switch 52A of the operation unit 52 is operated to be pressed, an image is played back and displayed on the back display unit 51 on the basis of the image data recorded in the internal memory. Then, in a case where an image to be wanted to be printed is displayed on the back display unit 51 and the user presses a printing switch 52B of the operation unit 52, printing processing to be performed by the printer unit 13 is started.

Further, a pair of finger rest portions 53A and 53B, which protrudes from the back of the camera body 11, is provided on the outer surface of the loading lid 24. The finger rest portions 53A and 53B continue from both side surfaces of the camera body 11 and are formed in the shape of a triangular protrusion that protrudes toward the rear side of the camera body 11.

The operation unit 52 includes a plurality of switches, which are used to perform various operations of the digital camera 10 including a printer, in addition to the menu switch 52A and the printing switch 52B having been described above. The display unit 51 and the operation unit 52 are positioned between the finger rest portions 53A and 53B in the horizontal direction H. More specifically, the operation unit 52 is disposed at a position where a distance L3 between the center of the operation unit 52 and the apex of the finger rest portion 53A is equal to a distance L4 between the center of the operation unit 52 and the apex of the finger rest portion 53B.

Figure 7A:
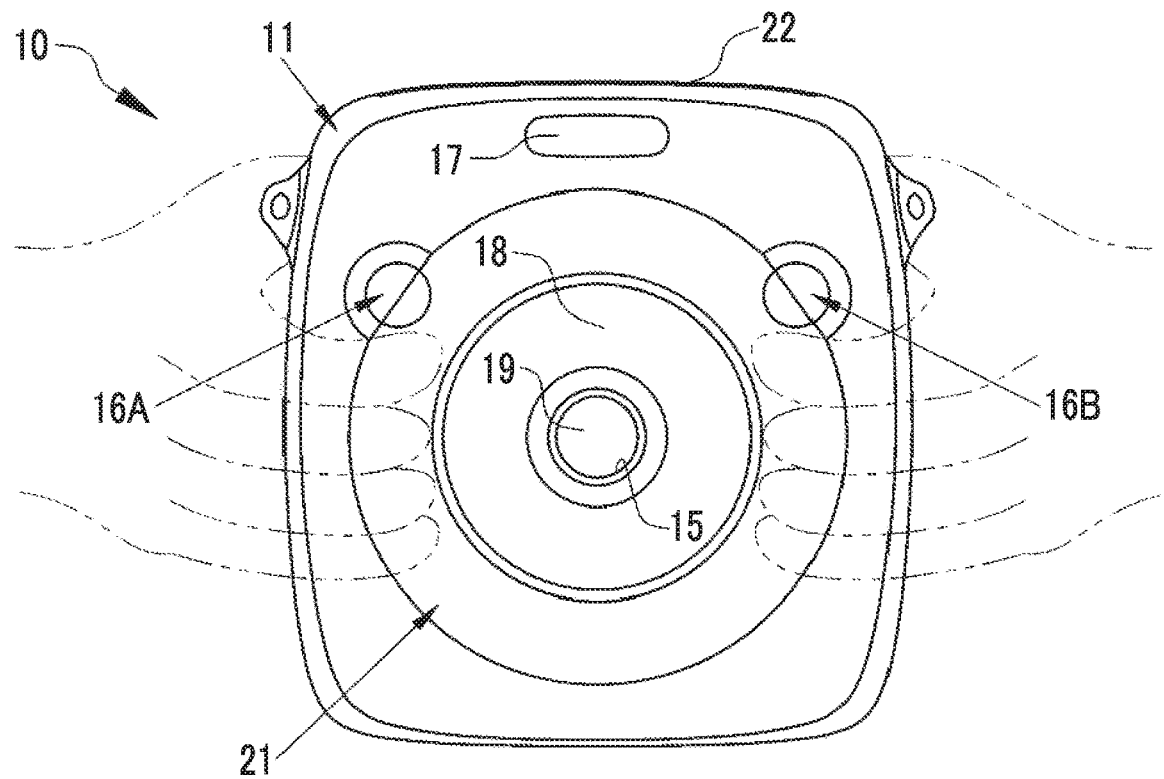
FIG. 7A is a diagram showing a case where an image is vertically taken using the digital camera including a printer.
Figure 7B:
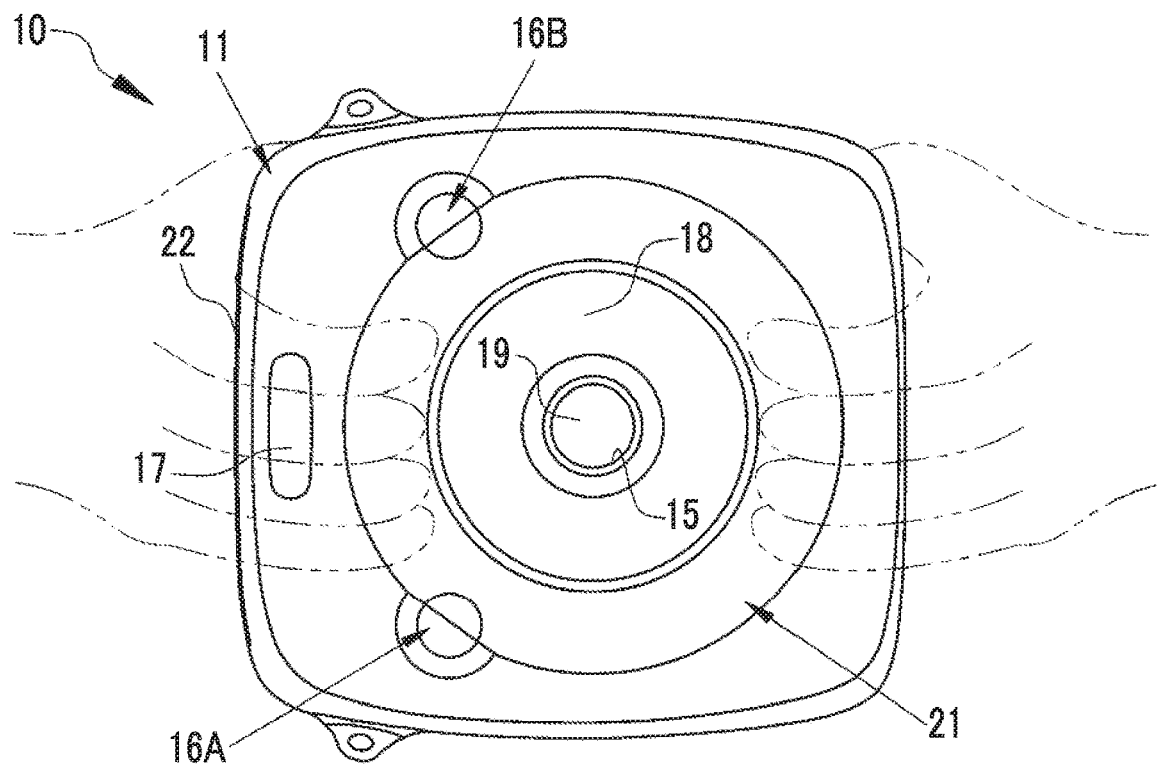
FIG. 7B is a diagram showing a case where an image is horizontally taken using the digital camera including a printer.

Next, the action of the digital camera 10 including a printer will be described with reference to FIGS. 7A, 7B, and 8. In a case where the operation ring 18 is operated to move rotationally to turn on the power supply of the digital camera 10 including a printer, power is supplied to each unit. Further, an imaging mode is set at this point of time and the solid-state imaging element 20 of the imaging unit 12 is driven. In the imaging mode, the solid-state imaging element 20 continuously takes subject images and the images are displayed on the back display unit 51. The user frames a subject while viewing the back display unit 51.

The user performs imaging by vertical imaging (see FIG. 7A) that is performed in a state where the camera body 11 is oriented vertically or horizontal imaging (see FIG. 7B) that is performed in a state where the camera body 11 is oriented horizontally, according to framing. Since the grip portion 21 is formed on the camera body 11 of the digital camera 10 including a printer, the user can reliably hold the camera body 11 with one's own right and left hands as shown in FIGS. 7A and 7B even in any case of the vertical imaging and the horizontal imaging. For this reason, the camera body 11 is easily held and a holding feeling is improved.

Further, since the camera body 11 has a square shape, the user can hold the camera body 11 in the same holding way and with the same force even in any case of the vertical imaging and the horizontal imaging. Accordingly, the ease of holding and a holding feeling are further improved.

Furthermore, since the grip portion 21 is formed in the shape of a ring, the user can reliably hold the camera body 11 even though the camera body 11 is oriented obliquely as in the case of an intermediate position between the vertical imaging and the horizontal imaging.

In a case where framing is performed and at least one of the release switch 16A or 16B is operated to be pressed, image data output from the solid-state imaging element 20 is recorded in the internal memory at that time. As described above, an image is played back and displayed on the back display unit 51 on the basis of the image data recorded in the internal memory, and printing processing to be performed by the printer unit 13 is started in a case where an image to be wanted to be printed is displayed on the back display unit 51 and the user presses the printing switch 52B of the operation unit 52.

In a case where the printing processing to be performed by the printer unit 13 is started, the film unit 23, which is discharged to the outside of the film pack 26 through the film sending port 27, is pinched and transported by the transport rollers 43 and 44. Then, exposure to be performed by the exposure head 41 is performed during the transport of the film unit 23. The exposure head 41 exposes an image (latent image), which corresponds to one screen, to the photosensitive layer of the film unit 23 on the basis of the image data recorded in the internal memory. Subsequently, the film unit 23 is transported toward the spreading rollers 45 and 46, and is pinched and transported by the spreading rollers 45 and 46. Accordingly, the developer 38 is spread into the gap 39 (see FIG. 4) as described above.

The film unit 23, which has been subjected to development processing, is transported to the film discharge port 22 and is discharged to the outside of the camera body 11. Then, after predetermined time has passed, a positive image appears on the positive image observation surface 40 of the discharged film unit 23.

Further, since a part of the release switches 16A and 16B are disposed in the grip portion 21 as described above, the user can recognize the positions of the release switches 16A and 16B through only the feeling of fingertips. As a result, operability is improved. Furthermore, since the release switches 16A and 16B are disposed at positions that are symmetric with respect to the vertical axis AV, it is easy for the user to press the release switches 16A and 16B even in any case of the vertical imaging and the horizontal imaging.

Figure 8:
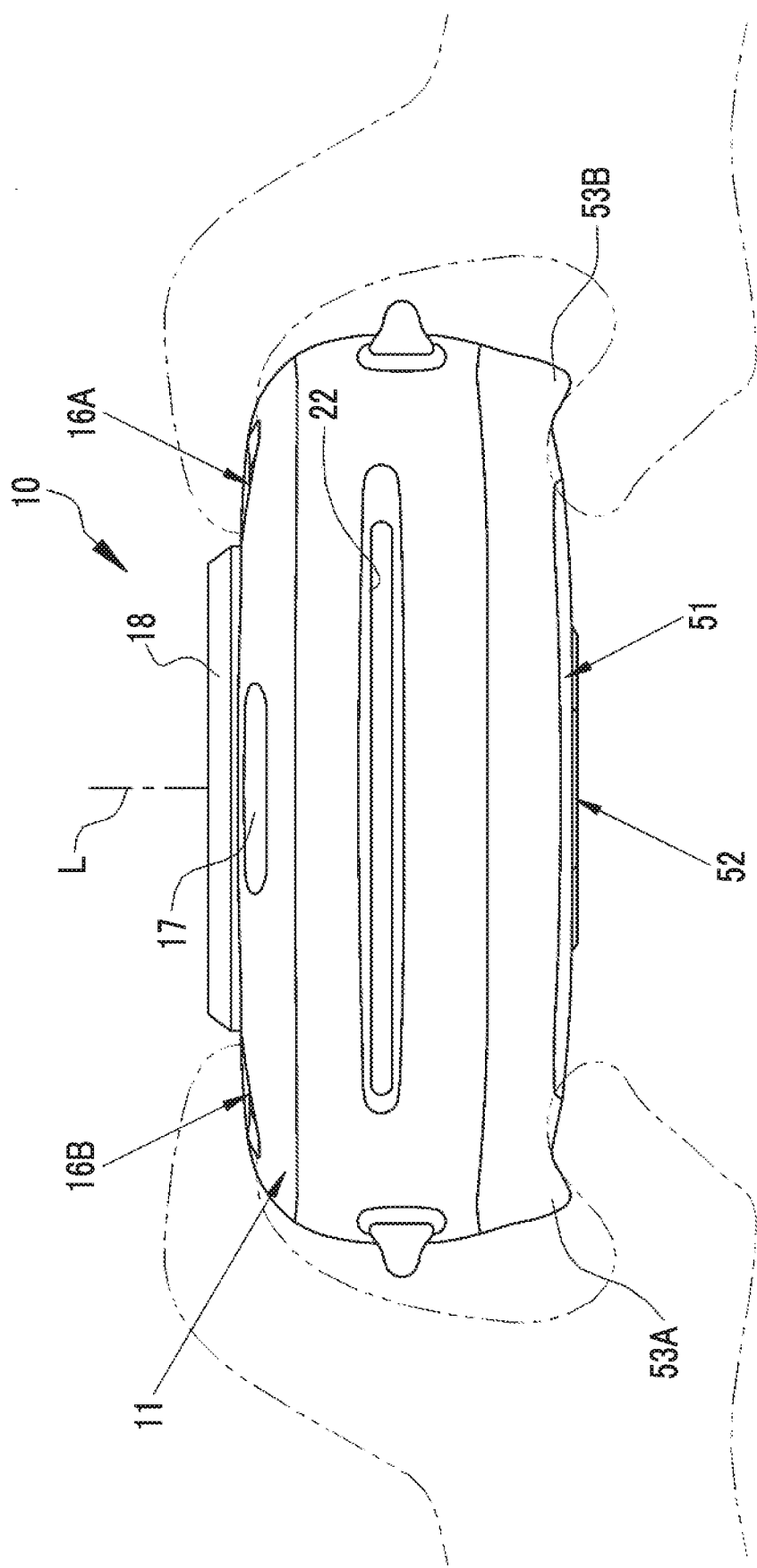
FIG. 8 is a top view of the digital camera including a printer.

Further, since the camera body 11 is provided with the pair of finger rest portions 53A and 53B that protrudes from the back, it is easy for the user to hold the camera body 11 while putting the thumbs on the finger rest portions 53A and 53B as shown in FIG. 8. Furthermore, since the operation unit 52 is positioned between the finger rest portions 53A and 53B, it is possible to easily perform various operations of the digital camera 10 including a printer while holding the camera body 11.

Second Embodiment

Figure 9:
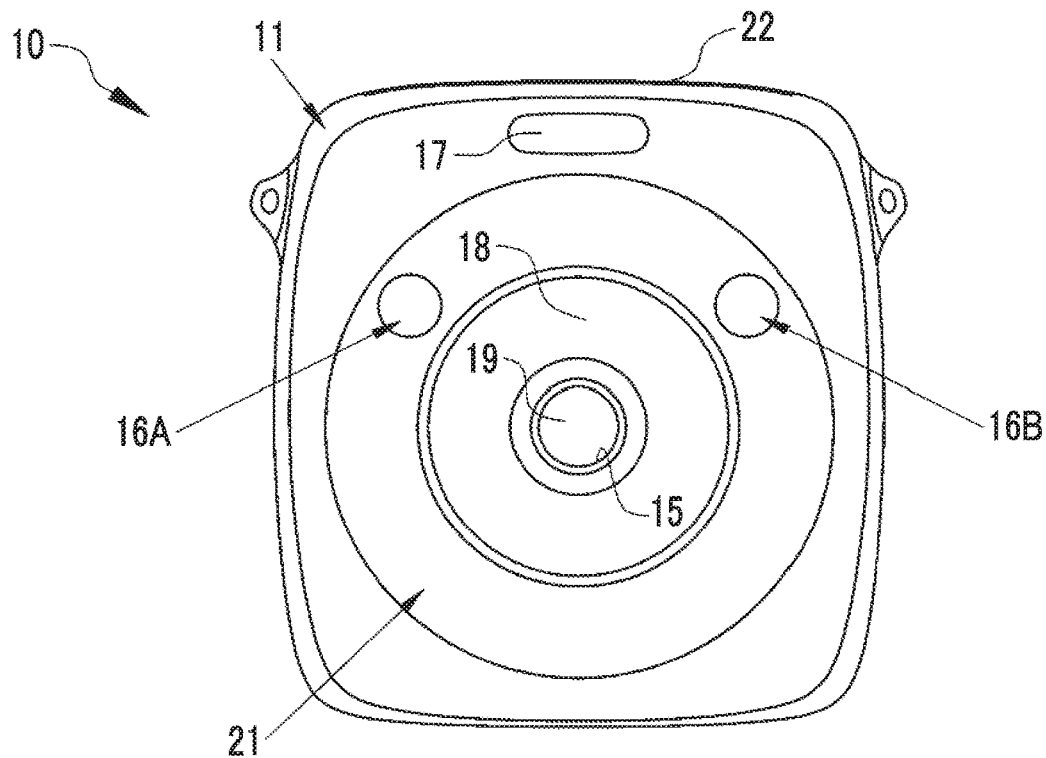
FIG. 9 is a front view of a digital camera including a printer of a second embodiment.

A part of the release switches 16A and 16B are disposed in the grip portion 21 in the first embodiment, but the entire release switches 16A and 16B are disposed in the grip portion 21 as shown in FIG. 9 in a second embodiment. The release switches 16A and 16B are formed in the shape of a curved surface that is concave along the concave shape. Accordingly, as with the first embodiment, operability is improved since a user can recognize the positions of the release switches 16A and 16B through only the feeling of fingertips.

Third Embodiment

Figure 10:
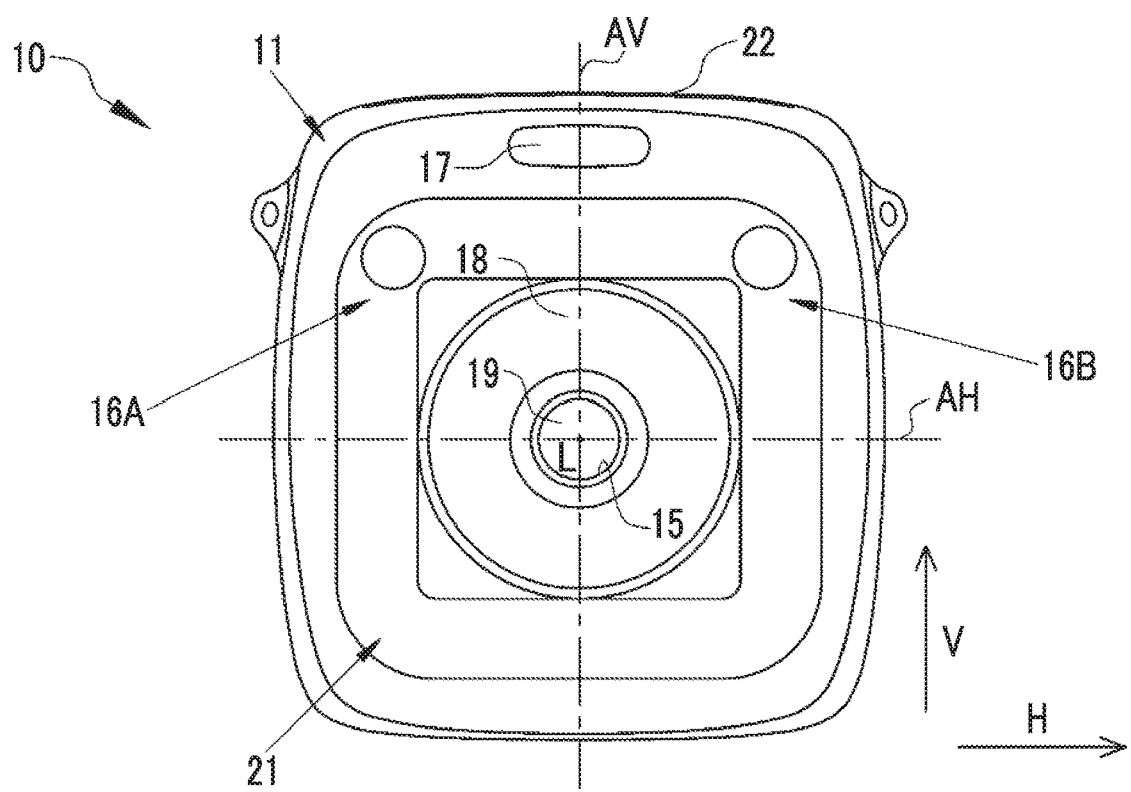
FIG. 10 is a front view of a digital camera including a printer of a third embodiment.

The grip portion 21 has an annular shape and a concave shape in each of the embodiments, but a grip portion 21 has the shape of a rectangular frame and a concave shape as shown in FIG. 10 in a third embodiment. An imaging optical system 19 is positioned at the center of the annular grip portion 21 in a case where a digital camera 10 including a printer is viewed from the front surface of the camera body 11. That is, as with the first embodiment, the grip portion 21 is formed at positions that are symmetric with respect to the vertical axis AV and are symmetric with respect to the horizontal axis AH. Further, the entire release switches 16A and 16B are disposed in the grip portion 21 as with the second embodiment, but a part of the release switches 16A and 16B may be disposed in the grip portion 21 as with the first embodiment.

Fourth Embodiment

Figure 11:
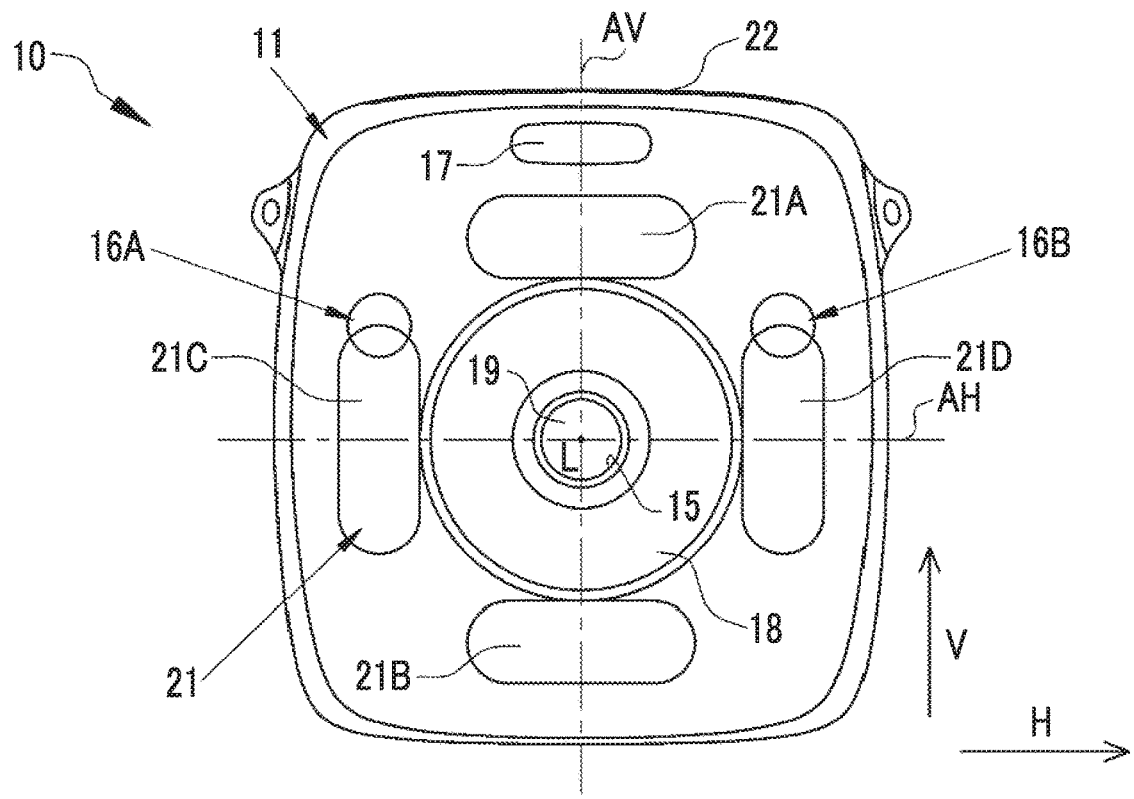
FIG. 11 is a front view of a digital camera including a printer of a fourth embodiment.

The grip portion 21 has the shape of one ring and a concave shape in each of the embodiments, but a grip portion 21 has a plurality of concave areas or convex areas as shown in FIG. 11 in a fourth embodiment. Specifically, the grip portion 21 is formed with four concave areas 21A to 21D, and the concave areas 21A and 21B are formed at positions symmetric with respect to the horizontal axis AH and the concave areas 21C and 21D are formed at positions symmetric with respect to the vertical axis AV. Further, a part of the release switches 16A and 16B are disposed in the grip portion 21 as with the first embodiment, but the entire release switches 16A and 16B may be disposed in the grip portion 21 as with the second embodiment.

Fifth Embodiment

Figure 12:
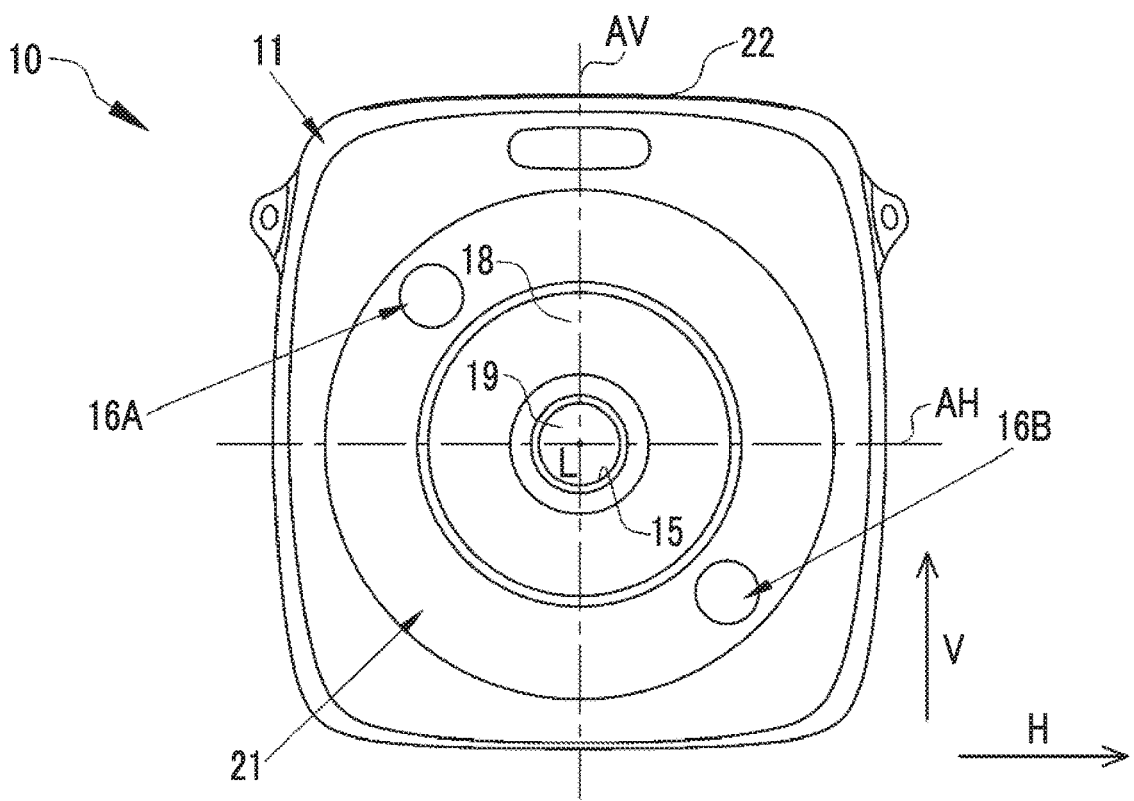
FIG. 12 is a front view of a digital camera including a printer of a fifth embodiment.

The release switches 16A and 16B are disposed at positions symmetric with respect to the vertical axis AV in each of the embodiments, but may be disposed at positions rotationally symmetric with respect to the imaging optical system 19 as a center by an angle of 180°, specifically, at positions rotationally symmetric with respect to the optical axis L as a center by an angle of 180° as shown in FIG. 12 in a fifth embodiment. The entire release switches 16A and 16B are disposed in the grip portion 21 as with the second embodiment, but a part of the release switches 16A and 16B may be disposed in the grip portion 21 as with the first embodiment.

Sixth Embodiment

Figure 13:
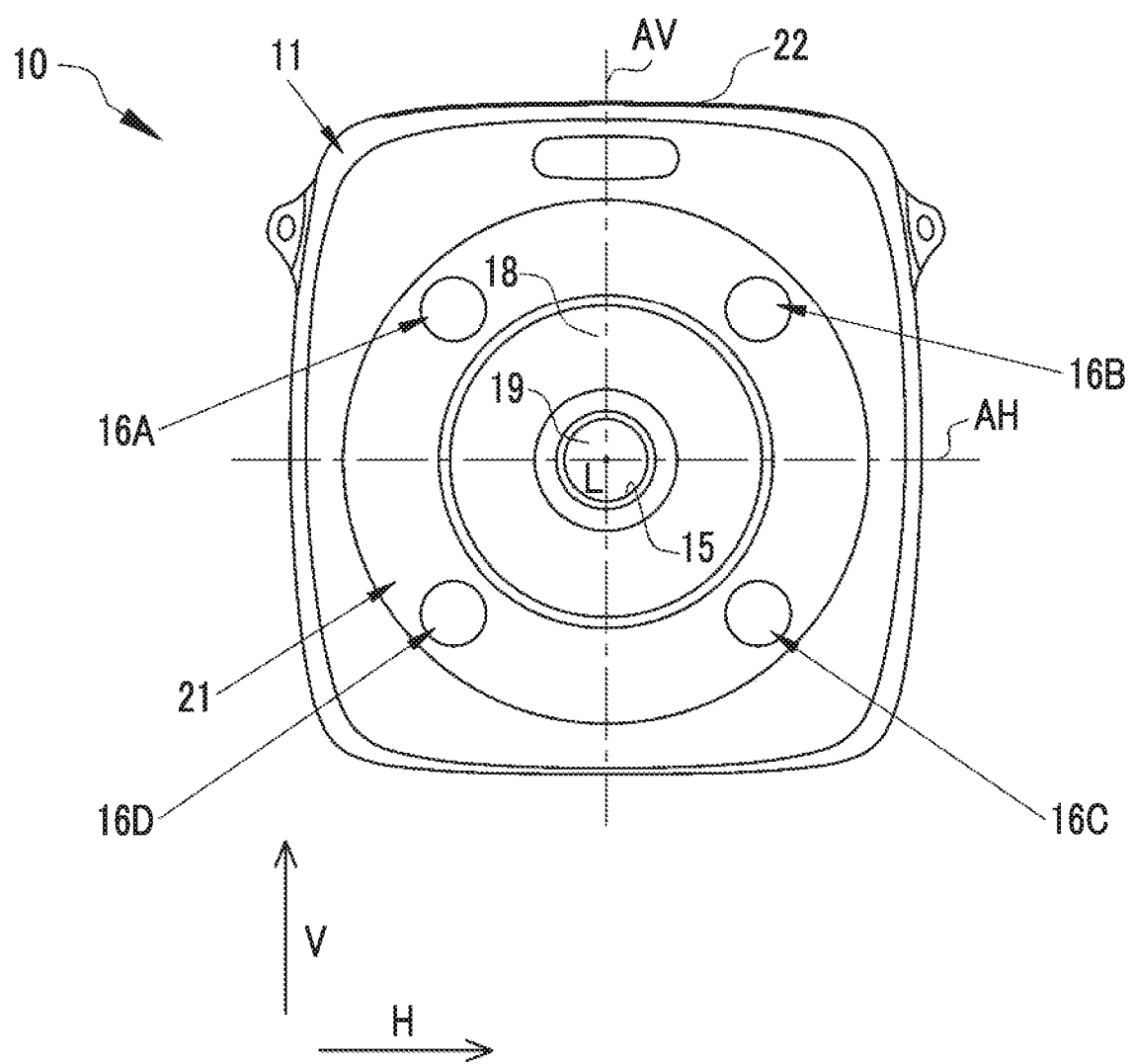
FIG. 13 is a front view of a digital camera including a printer of a sixth embodiment.

The camera body 11 is provided with two release switches 16A and 16B in each of the embodiments, but the camera body 11 is provided with four release switches 16A to 16D as shown in FIG. 13 in a sixth embodiment. The release switches 16A to 16D are disposed at positions that are symmetric with respect to the vertical axis AV and are symmetric with respect to the horizontal axis AH. The entire release switches 16A to 16D are disposed in the grip portion 21 as with the second embodiment, but a part of the release switches 16A to 16D may be disposed in the grip portion 21 as with the first embodiment.

The grip portion 21 has a concave shape that is concave from the surface around the grip portion 21 in each of the embodiments, but is not limited thereto and may have a convex shape that is convex from the surface around the grip portion 21. In this case, it is preferable that the release switches are formed in the shape of a curved surface convex along the convex shape of the grip portion 21. Further, the first direction is set to the vertical direction V and the second direction is set to the horizontal direction H in each of the embodiments, but the first direction may be set to the horizontal direction H and the second direction may be set to the vertical direction V.

A mono-sheet instant film is used as a recording medium and a film pack in which instant films are stored is used as a recording medium pack in each of the embodiments having been described above, but the invention is not limited thereto. Thermosensitive recording paper in which thermosensitive coloring layers are laminated, plain paper, exclusive paper (paper of which the surfaces are coated, and the like), an OHP sheet can be used as the recording medium. In a case where thermosensitive recording paper is used as the recording medium, thermal recording using a thermal head is performed. Further, in a case where plain paper or the like is used as the recording medium, recording using inkjet, thermal fusion, thermal transfer, or the like is performed.

What is claimed is:

1. A digital camera including a printer comprising:
    an imaging unit that includes an imaging optical system and takes a subject image to output image data;
    a printer unit that records an image on a recording medium on the basis of the image data output from the imaging unit; and
    a camera body where the imaging optical system is disposed at a center of a front surface thereof and a grip portion is formed at positions symmetric with respect to a first axis crossing an optical axis of the imaging optical system in a first direction and symmetric with respect to a second axis crossing the optical axis in a second direction orthogonal to the first direction,
    wherein the grip portion has a concave or convex ring shape, and the imaging optical system is positioned at a center of the ring shape.

2. The digital camera including a printer according to claim 1,
    wherein a shape of the camera body viewed from the front surface is a square shape where a vertical length in the first direction and a horizontal length in the second direction are equal to each other.

3. The digital camera including a printer according to claim 1, wherein the grip portion has a plurality of concave areas or convex areas formed around the imaging optical system.

4. The digital camera including a printer according to claim 1,
wherein the camera body includes a release switch that is used to take a subject image by the imaging unit, and at least a part of the release switch is positioned within the concave area or the convex area.

5. The digital camera including a printer according to claim 1,
wherein the camera body includes a release switch that is used to take a subject image by the imaging unit, and the entire release switch is positioned within the concave area or the convex area.

6. The digital camera including a printer according to claim 4,
wherein the camera body is provided with two release switches, and the two release switches are disposed at positions that are symmetric with respect to the first axis.

7. The digital camera including a printer according to claim 4,
wherein the camera body is provided with two release switches, and the two release switches are disposed at positions that are rotationally symmetric with respect to the imaging optical system as a center by an angle of 180°.

8. The digital camera including a printer according to claim 1, further comprising:
a flash that irradiates a subject with illumination light,
wherein the flash is disposed at a position that corresponds to the imaging optical system in the first direction or the second direction.

9. The digital camera including a printer according to claim 8,
wherein the recording medium is a mono-sheet instant film,
the printer unit includes an exposure head that exposes the instant film on the basis of the image data to record an image, and
the exposure head is positioned between the flash and the imaging unit.

10. The digital camera including a printer according to claim 9,
wherein the instant film is loaded in the camera body in a state where the instant film is stored in a film pack, and
the camera body includes a loading lid that is provided on a back side thereof and loads the film pack.

11. The digital camera including a printer according to claim 10, further comprising:
a transport roller that transports the instant film,
wherein an exposure position where the exposure head exposes the instant film is positioned between the film pack and the transport roller.

12. The digital camera including a printer according to claim 9,
wherein the camera body includes a discharge port for the instant film at one end of the camera body in the first direction or the second direction.

13. The digital camera including a printer according to claim 12,
wherein the camera body includes a display unit that is provided on a back thereof and displays an image, and
a transport path along which the instant film is discharged from the discharge port is positioned between the imaging unit and the display unit.

14. The digital camera including a printer according to claim 1, further comprising:
an operation unit that is positioned between the grip portion and the imaging optical system.

15. The digital camera including a printer according to claim 1,
wherein a finger rest portion, which protrudes from the back and has a convex shape, is formed on the camera body.

* * * * *